United States Patent
Wang et al.

(10) Patent No.: US 9,268,426 B2
(45) Date of Patent: Feb. 23, 2016

(54) REMOTE CONTROL METHOD OF MULTI-MODE REMOTE CONTROLLER, REMOTE CONTROLLER, USER TERMINAL AND SYSTEM

(75) Inventors: Xiaohui Wang, Guangdong (CN); Chi Shi, Guangdong (CN); Guohong Mao, Guangdong (CN); Guang Zhou, Guangdong (CN); Lifu Wen, Guangdong (CN)

(73) Assignees: Shenzhen Skyworth Digital Technology Co., Ltd., Nanshan District, Shenzhen, Guangdong (CN); Shenzhen Skyworth Software Co., Ltd., Nanshan District, Shenzhen, Gaungdong (CN)

( * ) Notice: Subject to any disclaimer, the term of this patent is extended or adjusted under 35 U.S.C. 154(b) by 151 days.

(21) Appl. No.: 14/238,713

(22) PCT Filed: Apr. 10, 2012

(86) PCT No.: PCT/CN2012/073699
§ 371 (c)(1),
(2), (4) Date: Feb. 12, 2014

(87) PCT Pub. No.: WO2013/123693
PCT Pub. Date: Aug. 29, 2013

(65) Prior Publication Data
US 2014/0198044 A1   Jul. 17, 2014

(30) Foreign Application Priority Data
Feb. 24, 2012   (CN) .......................... 2012 1 0043653

(51) Int. Cl.
G06F 3/02       (2006.01)
G06F 3/041      (2006.01)
G06F 3/038      (2013.01)
(Continued)

(52) U.S. Cl.
CPC ................ *G06F 3/041* (2013.01); *G06F 3/038* (2013.01); *G06F 3/03543* (2013.01); *G06F 3/03549* (2013.01); *G06F 3/0488* (2013.01);
(Continued)

(58) Field of Classification Search
None
See application file for complete search history.

(56) References Cited

U.S. PATENT DOCUMENTS 6,107,992 A *  8/2000  Ishigaki ................. G08C 17/00
                                                        345/158
6,507,306 B1   1/2003  Griesau et al.
(Continued)

FOREIGN PATENT DOCUMENTS

| CN | 1719394    |   | 1/2006  |
|----|------------|---|---------|
| CN | 101185051  |   | 5/2008  |
| CN | 102279665  |   | 12/2011 |
| CN | 102737721  | A | 10/2012 |

*Primary Examiner* — Muhammad N Edun
(74) *Attorney, Agent, or Firm* — Frommer Lawrence & Haug LLP; William S. Frommer

(57) ABSTRACT

Described is a remote control method of a multi-mode remote controller, comprising the following steps of: determining a current control mode, the remote controller comprising various control modes; obtaining a touch control signal of a user on a touch screen; and analyzing the touch control signal, generating a remote control instruction corresponding to the touch control signal under the current control mode, and sending the instruction to a user terminal, so that the user terminal operates currently displayed content. It is further provided a multi-mode remote controller, a user terminal and a system. Seamless automatic switching among multiple control modes in the remote controller with a touch screen can be realized, so as to meet various interaction requirements of different kinds of users.

14 Claims, 5 Drawing Sheets

(51) Int. Cl.
   *G06F 3/0488*  (2013.01)
   *H04M 1/725*  (2006.01)
   *H04N 21/422*  (2011.01)
   *G06F 3/0354*  (2013.01)
(52) U.S. Cl.
   CPC ..... *H04M1/72533* (2013.01); *H04N 21/42224* (2013.01); *H04N 21/42228* (2013.01)

(56) References Cited

U.S. PATENT DOCUMENTS

2006/0220902 A1* 10/2006 Takahashi ........... G06F 3/03547 340/12.23
2010/0033438 A1* 2/2010 Fu ........................ G08C 23/04 345/173

* cited by examiner

REMOTE CONTROL METHOD OF MULTI-MODE REMOTE CONTROLLER, REMOTE CONTROLLER, USER TERMINAL AND SYSTEM

CROSS REFERENCE TO RELATED APPLICATIONS

The present application is a national stage application of International Application No. PCT/CN2012/073699, filed on Apr. 10, 2012, which is hereby incorporated by reference in its entirety.

FIELD OF THE INVENTION

The present invention relates to the field of remote control, and particularly relates to a method, a remote controller, a user terminal, and a system for remote control of a multi-mode remote controller.

BACKGROUND OF THE INVENTION

Nowadays, televisions become increasingly more intelligent and have more functions. They are configured with intelligent operating systems, bringing more functions and experience to the users, such as picture browse, e-book reading, network browse, etc. However, a remote controller matching with the television is relatively unintelligent, it is a conventional push-button remote controller, a simulation-mouse controller, or the like. These remote controllers can only function rigidly, and a method for integrating respective control modes together and switching among the multiple control modes is desirable.

SUMMARY OF THE INVENTION

In order to solve at least one part of the existing technical problems above, the present invention provides a remote control method, a multi-mode remote controller, a user terminal, and a system, using touch control technique for multi-mode remote controller. Thus, seamless automatic switching among multiple control modes can be realized, and various interaction requirements of different kinds of users can be satisfied.

In one embodiment of the present invention, it is provided a remote control method of multi-mode remote controller, comprising:

determining a current control mode, wherein the remote controller comprises various control modes;

analyzing a touch control signal, and generating a remote control instruction to be sent to a user terminal so that the user terminal operates a currently displayed content, wherein, the remote control instruction corresponds to the touch control signal under the current control mode.

Correspondingly, in another embodiment of the present invention, it is provided a multi-mode remote controller having multiple control modes, wherein the remote controller specifically comprises:

an obtaining module for obtaining a touch control signal on a touchscreen and from a user;

a microprocessor for analyzing the touch control signal obtained on the touchscreen and generating a corresponding remote control instruction; and a communicating module for sending the remote control instruction generated by the microprocessor to a user terminal.

Correspondingly, in yet another embodiment of the present invention, it is provided a user terminal, comprising:

a mode determining module for determining a current control mode;

a controlling module for determining an operation manner for a currently displayed content, according to the current control mode determined by the mode determining module and a received remote control instruction sent by a remote controller; and an operating module for operating the currently displayed content according to the operation manner for the currently displayed content which is determined by the controlling module.

Correspondingly, in yet another embodiment of the present invention, it is provided a remote control system for multi-mode remote controller, comprising a remote controller and a user terminal, wherein the remote controller comprises an multi-mode remote controller described in any one of claims 7-10, the user terminal comprises a user terminal described in any one of claims 11-15, and specifically, the user terminal comprises a television set-top box or a television.

The implementation of one embodiment of the present invention can have the following benefit effects.

In one embodiment of the present invention, a multi-mode remote controller and a remote control system include various control modes and can switch automatically among multiple control modes according to a remote control instruction and a current work scenario. After determining the current control mode, the remote control can be performed according to a touch control signal on the touchscreen from a user and the determined control mode. Even if a user inputs identical touch control signals on the touchscreen, it can also be generated respective remote control instructions corresponding to the touch control signal under respective current control modes due to that the current control modes can be different. Therefore, a method for switching automatically among various control modes can be realized, remote control functions of an ordinary remote controller can be improved, and remote control requirements of users can be satisfied.

DETAILED DESCRIPTION OF THE INVENTION

Technical solutions in embodiments of the present invention will be illustrated clearly and entirely with the aid of the drawings in the embodiments of the invention. It is apparent that the illustrated embodiments are only part of embodiments of the invention instead of all of them. Other embodiments that a person having ordinary skills in the art obtains based on the illustrated embodiments of the invention without paying any creative work should all be within the protection scope sought by the present invention.

Figure 1:
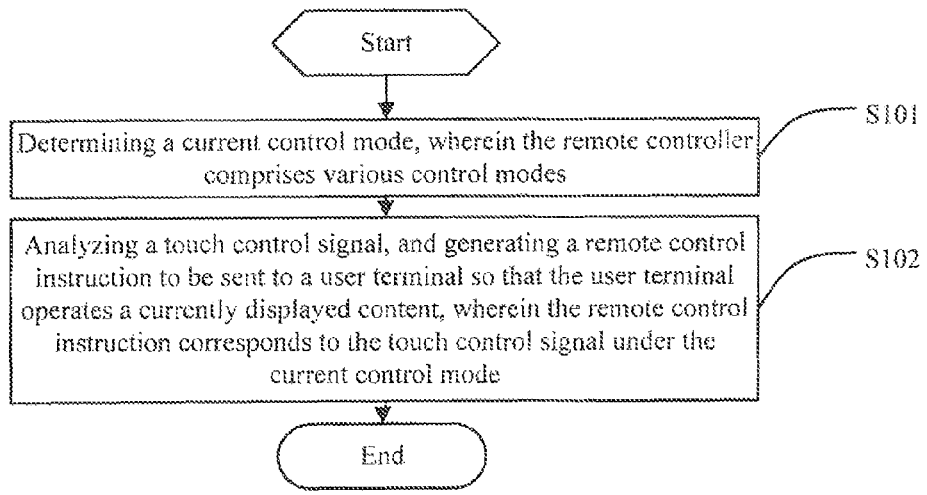
FIG. 1 is a flowchart of a remote control method for multi-mode remote controller according to a first embodiment of the present invention.

Referring to FIG. 1, it is a flowchart of a remote control method for multi-mode remote controller according to a first embodiment of the present invention. The method comprises the following steps.

Step S101 is: determining a current control mode, wherein the remote controller comprises various control modes.

Specifically, the current control mode of the remote controller includes any one or more of a button control mode, a mouse control mode, a touchscreen control mode, a trackball control mode.

A method for determining a current control mode of the remote controller in step S101 comprises:

collecting a remote control signal including a touchscreen absolute coordinate sent by a remote controller;

judging whether it is a click operation or a continuous operation according to the remote control signal;

if it is a click operation, determining that the current control mode is a button control mode, and the click operation can be interpreted as a button press operation; and if it is a continuous operation, according to a current application scenario of the user terminal, determining that the current control mode is a mouse control mode, a touchscreen control mode, or a trackball control mode, and the continuous operation can be correspondingly interpreted as a mouse operation, a touch control operation, or a trackball operation.

Step S102 is: analyzing a touch control signal, and generating a remote control instruction to be sent to a user terminal so that the user terminal operates a currently displayed content, wherein the remote control instruction corresponds to the touch control signal under the current control mode.

Specifically, according to the touch control signal on the touchscreen from the user obtained in step S101 and the current control mode determined in step S101, the touch control signal on the touchscreen from the user may be analyzed, and a remote control instruction corresponding to the touch control signal under the current control mode can be generated. It can be specifically described as below.

When the current control mode determined in step S101 is the button control mode, the touch control signal can be converted into a corresponding button-press code value according to a click position of touchscreen. According to the button-press code value, the remote control instruction corresponding to the touch control signal under the button control mode can be generated to control the operation of a user terminal. For example, if the touch control signal on the touchscreen from the user obtained in step S101 is a button clicking operation, in step S102, according to the button control mode determined in step S101, a signal of the button clicking operation can be collected, and the touch control signal based on the clicking position of the touchscreen can be converted into a corresponding button-press code value. According to the button-press code value, a remote control instruction corresponding to the touch control signal under the button control mode can be generated to control the operation of the user terminal.

When the current control mode determined in step S101 is the mouse control mode, the touch control signal can be converted into a relative coordinate value of a corresponding position. According to the relative coordinate value, the remote control instruction corresponding to the touch control signal under the mouse control mode can be generated to operate the currently displayed content. Herein, on the user terminal interface, a mouse cursor is displayed to indicate that it works under the mouse control mode.

When the current control mode is the touchscreen control mode, the touch control signal can be converted into a touchscreen operation code. According to the touchscreen operation code, the remote control signal corresponding to the touch control signal under the touchscreen control mode can be generated to operate the currently displayed content. On the user terminal interface herein, no mouse cursor is displayed.

When the current control mode is the trackball control mode, the touch control signal can be converted into a relative offset of a coordinate of a corresponding position. According to the relative offset of the coordinate of the corresponding position, the remote control instruction corresponding to the touch control signal under the trackball control mode can be generated to operate the currently displayed content. On the user terminal interface herein, a trackball cursor is displayed to indicate that it works under the trackball control mode.

In one embodiment of the present invention, after a touch control signal on the touchscreen from the user is obtained, according to the determined current control mode of the remote controller, the touch control signal can be analyzed, and a remote control instruction corresponding to the touch control signal under the current control mode can be generated. According to the remote control instruction, the user terminal operates the currently displayed content. In one embodiment of the present invention, after the current control mode of the remote controller is determined, the touch control signal on the touchscreen from the user can be identified, and the remote control instruction corresponding to the touch control signal under the current control mode can be generated. Even if a user inputs identical touch control signals on the touchscreen, it can also be generated respective remote control instructions corresponding to the touch control signal under respective current control modes, due to that the current control modes can be different. Therefore, a method for switching automatically among various control modes can be realized, remote control functions of an ordinary remote controller can be improved, and remote control requirements of users can be satisfied.

Figure 2:
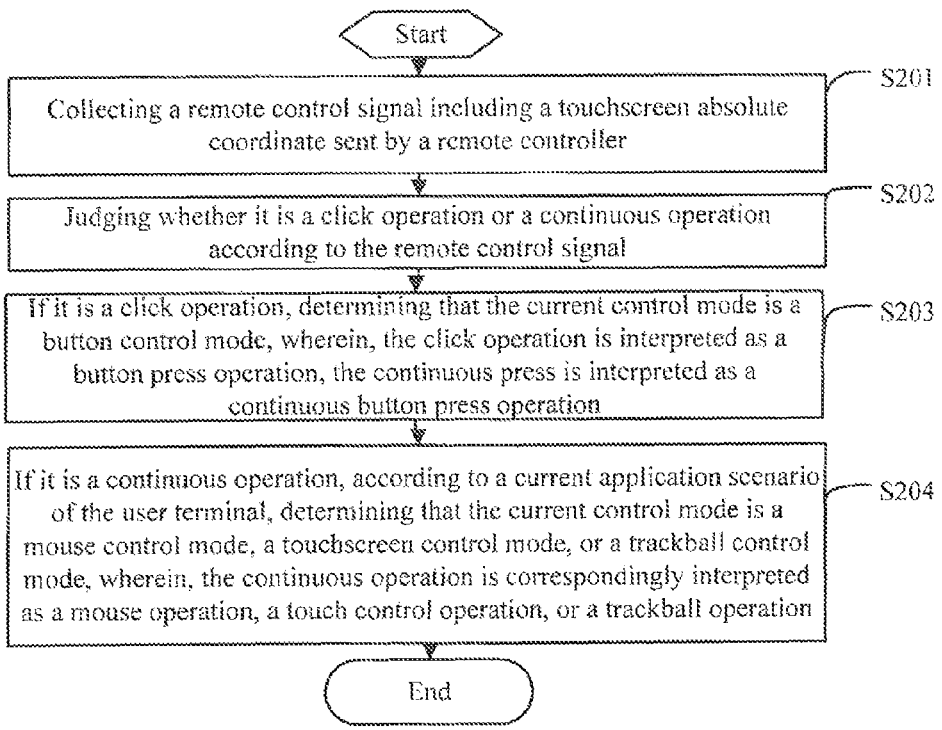
FIG. 2 is a flowchart of a remote control method for multi-mode remote controller according to a second embodiment of the present invention.

Referring to FIG. 2, it is a flowchart of a remote control method for multi-mode remote controllers according to a second embodiment of the present invention. The method comprises the following steps.

Step S201 is: collecting a remote control signal including a touchscreen absolute coordinate sent by a remote controller.

Specifically, the remote control signal including a touchscreen absolute coordinate sent by the remote controller comprises: vertical/horizontal-coordinate values for a click on the touchscreen, a certain point for a continuous press on the touchscreen, vertical/horizontal-coordinate values for a continuous swipe action on multiple points, vertical/horizontal-coordinate values for a continuous swipe on a single point, a button-press operation code, a button-press operation code with vertical/horizontal-coordinates for a click on a touchscreen, or a button-press operation code with vertical/horizontal-coordinates for a continuous swipe action on the touchscreen.

step S202 is: judging whether it is a click operation or a continuous operation according to the remote control signal.

Specifically, according to the remote control signal which includes a touchscreen absolute coordinate sent by the remote controller and collected in step S201, for example, if the remote control signal collected in step S201 is a remote control signal having vertical/horizontal-coordinate values for a click on the touchscreen or the one of a continuous press at a certain point on the touchscreen, it can be judged that this is a click operation; and as another example, if the remote control signal collected in step S201 is a remote control signal having vertical/horizontal-coordinate values for a continuous swipe action on the touchscreen, then it can be judged that this is a continuous operation.

Step S203 is: if it is a click operation, determining that the current control mode is a button control mode, wherein the click operation is interpreted as a button press operation, the continuous press is interpreted as a continuous button press operation.

Specifically, according to whether the judged operation in step S202 is a click operation or a continuous operation, if the judged operation in step S202 is a click operation, then the current control mode can be determined as a button control mode, and the click operation can interpreted as a button press operation.

Step S204 is: if it is a continuous operation, according to a current application scenario of the user terminal, determining that the current control mode is a mouse control mode, a touchscreen control mode, or a trackball control mode, wherein the continuous operation is correspondingly interpreted as a mouse operation, a touch control operation, or a trackball operation.

In one embodiment of the present invention, a remote control signal including a touchscreen absolute coordinate sent by the remote controller can be collected. According to the remote control signal, whether it is a click operation or a continuous operation can be judged. If it is a click operation, a current control mode as the button control mode can be determined, wherein the click operation can be interpreted as a button press operation. If it is a continuous operation, according to a current application scenario, a current control mode as the mouse control mode, the touchscreen control mode, or the trackball control mode can be determined, wherein the continuous operation can be correspondingly interpreted as a mouse operation, a touch control operation, or a trackball operation. In one embodiment of the present invention, it is provided a method of determining a current control mode of the remote controller by collecting and judging a remote control signal including a touchscreen absolute coordinate sent by the remote controller.

Figure 3:
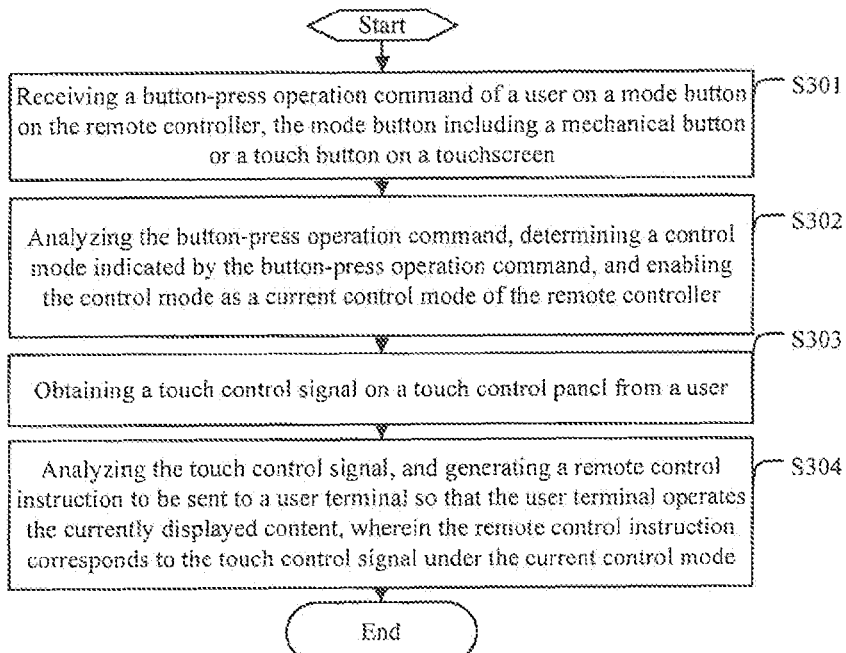
FIG. 3 is a flowchart of a remote control method for multi-mode remote controller according to a third embodiment of the present invention.

Referring to FIG. 3, it is a flowchart of a remote control method for multi-mode remote controllers according to a third embodiment of the present invention. The method comprises the following steps.

Step S301 is: receiving a button-press operation command of a user on a mode button on the remote controller, the mode button including a mechanical button or a touch button on a touchscreen.

Specifically, in one embodiment of the present invention, the mode button includes a mechanical button or a touch button on the touchscreen, the mechanical button including a button, a mouse, and a trackball etc. In step S301, the button-press operation command of the user on the mode button on the remote controller can be obtained.

Step S302 is: analyzing the button-press operation command, determining a control mode indicated by the button-press operation command, and enabling the control mode as a current control mode of the remote controller.

Specifically, according to the button-press operation command of the user on the mode button on the remote controller received in step S301, the button-press operation command can be analyzed; the control mode indicated by the button-press operation command can be determined, and can be enabled as the current control mode of the remote controller. For example, if a button-press operation command of a user clicking button action on the remote controller is received in step 301, it can be analyzed; the touch control signal can be converted into a corresponding button-press code value; a button control mode indicated by the button-press operation command can be determined; and the button control mode can be enabled as a current control mode of the remote controller.

Step S303 is: obtaining a touch control signal on the touchscreen from a user.

Step S304 is: analyzing the touch control signal, and generating a remote control instruction to be sent to a user terminal so that the user terminal operates a currently displayed content, wherein the remote control instruction corresponds to the touch control signal under the current control mode.

In one embodiment of the present invention, a button-press operation command of a user clicking a mode button on the remote controller can be received, the mode button including a mechanical button or a touch button on a touchscreen; the button-press operation command can be analyzed: a control mode indicated by the button-press operation command can be determined; and the control mode can be enabled as a current control mode of the remote controller. In one embodiment of the present invention, it is provided a method for realizing switch among various control modes in the remote controller by clicking the mode button on the remote controller.

Figure 4:
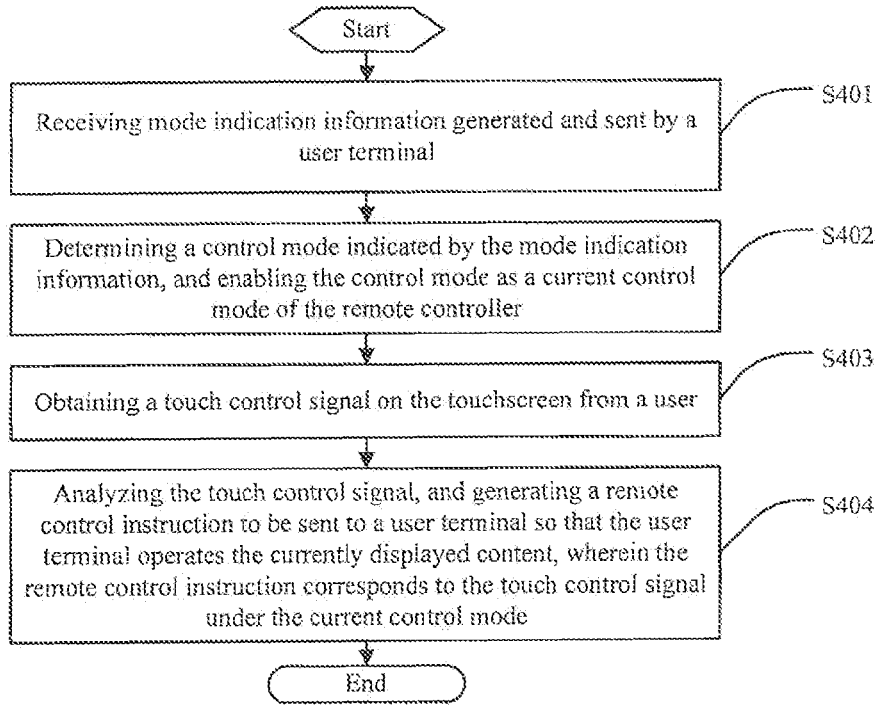
FIG. 4 is a flowchart of a remote control method for multi-mode remote controller according to a fourth embodiment of the present invention.

Referring to FIG. 4, it is a flowchart of a remote control method for multi-mode remote controllers according to a fourth embodiment of the present invention. The method comprises the following steps.

Step S401 is: receiving mode indication information generated and sent by a user terminal.

Specifically, in step S401, the user terminal generating the mode indication information comprises: according to a control mode selected by the user on a human-computer interaction interface provided by the user terminal, generating mode indication information; and/or according to a control mode requested by a currently running application program, generating mode indication information.

Step S402 is: determining a control mode indicated by the mode indication information, and enabling the control mode as a current control mode of the remote controller.

Specifically, according to the received mode indication information which is generated and sent by the user terminal in step S401, the control mode indicated by the mode indication information can be determined, and can be enabled as the current control mode of the remote controller. For one example, if the control mode selected by the user on the human-computer interaction interface provided by the user terminal is a button control mode, the mode indication information of the button control mode can be generated; in step S402, according to the determined mode indication information, the control mode indicated by the mode indication information can be determined as a button control mode; and the button control mode can be served as a current control mode of the remote controller. For another example, if the control mode requested by the currently running application program of the user terminal is a trackball control mode, mode indication information of the trackball control mode can be generated; in step S402, according to the determined mode indication information, a control mode indicated by the mode indication information can be determined as a trackball control mode; and the trackball control mode can be served as a current control mode of the remote controller.

Step S403, obtaining a touch control signal on the touchscreen from a user.

Step S404 is: analyzing the touch control signal, and generating a remote control instruction to be sent to a user terminal so that the user terminal operates a currently displayed content, wherein the remote control instruction corresponds to the touch control signal under the current control mode.

In one embodiment of the present invention, based on the received mode indication information which is generated and sent by the user terminal, a control mode indicated by the mode indication information can be determined; and the control mode can be enabled as a current control mode of the remote controller. In one embodiment of the present invention, the user terminal generating mode indication information comprises: according to a control mode selected by the user on a human-computer interaction interface provided by the user terminal, generating mode indication information; and/or according to a control mode requested by a currently running application program, generating mode indication information. Thus, in one embodiment of the present invention, switching among various control modes in the remote controller can be realized, and different interaction requirements of users can be satisfied.

Figure 5:
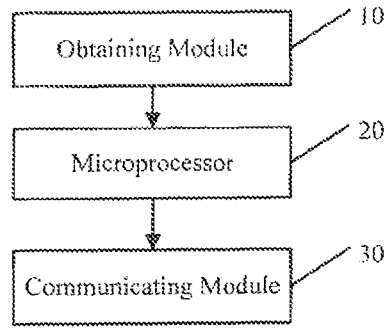
FIG. 5 is a structure diagram of a multi-mode remote controller according to the present invention.

Referring to FIG. 5, it is a structure diagram of a multi-mode remote controller according to the present invention. As shown in FIG. 5, the remote controller comprises:

an obtaining module 10 which is used for obtaining a touch control signal on a touchscreen from a user;

specifically, the obtaining module 10 is used to collect a remote control signal including a touchscreen absolute coordinate sent by the remote controller; the remote control signal which includes a touchscreen absolute coordinate sent by the remote controller comprises: vertical/horizontal-coordinate values for a click on the touchscreen, a certain point for a continuous press on the touchscreen, vertical/horizontal-coordinate values for a continuous swipe action on multiple points, vertical/horizontal-coordinate values for a continuous swipe on a single point, a button-press operation code, a button-press operation code with vertical/horizontal-coordinates for a click on a touchscreen, or a button-press operation code with vertical/horizontal-coordinates for a continuous swipe action on the touchscreen;

a microprocessor 20 which is used for analyzing the touch control signal obtained on the touchscreen and generating a corresponding remote control instruction;

specifically, the obtaining module 10 collects the remote control signal including the touchscreen absolute coordinate sent by the remote controller; according to the remote control signal, the microprocessor 20 judges whether it is a click operation or a continuous operation; if it is a click operation, the current control mode as a button control mode can be determined, and the click operation can be interpreted as a button press operation; and if it is a continuous operation, according to the current application scenario of the user terminal, a current control mode can be determined as a mouse control mode, a touchscreen control mode, or a trackball control mode, and the continuous operation can be interpreted as a mouse operation, a touch control operation or a trackball operation;

otherwise, based on the structure of the multi-mode remote controller, the microprocessor 20 do not have to make a judgment on the mode described above, it directly sends the remote control instruction including a position coordinate of the touchscreen to the user terminal, so that the mode determining module of the user terminal can make the judgment on the mode described above;

a communicating module 30 which is used for sending the remote control instruction generated by the microprocessor to a user terminal;

specifically, the communicating module 30 is used to send the remote control instruction generated by the microprocessor 20 to the user terminal; and/or receive operation manner information determined by the user terminal;

it should be noted that the multi-mode remote controller can also comprise an indicator light; and the indicator light is used to indicate a current control mode of the remote controller.

Figure 6:
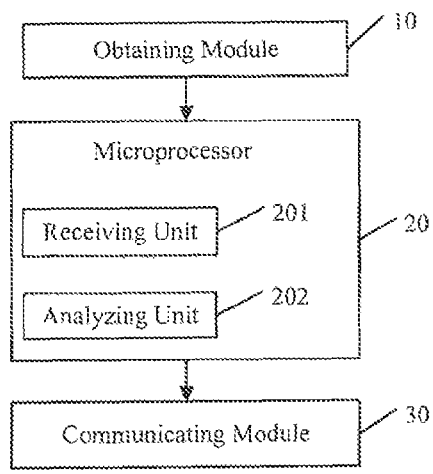
FIG. 6 is a second structure diagram of a multi-mode remote controller according to the present invention.

Referring to FIG. 6, it is a second structure diagram of a multi-mode remote controller according to the present invention. The multi-mode remote controller comprises the obtaining module 10, and the communicating module 30 described in FIG. 5. In one embodiment, the microprocessor 20 comprises:

a receiving unit 201 which is used for receiving a button-press operation command of a user on a mode button on the remote controller, the mode button including a mechanical button or a touch button on a touchscreen;

specifically, in one embodiment of the present invention, the mode button includes a mechanical button or a touch button on the touchscreen, the mechanical button including a button, a mouse, a trackball, a touchscreen, etc.;

an analyzing unit 202 which is used for determining, according to the button-press operation command on the mode button received by the receiving unit 201, a control mode indicated by the button-press operation command to have the control mode to serve as a current control mode of the remote controller;

specifically, according to the button-press operation command of the user on the mode button on the remote controller received by the receiving unit 201, the button-press operation command can be analyzed; the control mode indicated by the button-press operation command can be determined; and the control mode can be enabled as the current control mode of the remote controller; for example, if the receiving unit 201 receives a button-press operation command of a user clicking button action on the remote controller, the analyzing unit 202 analyzes the button-press operation command of the button clicking operation, converts the touch control signal into a corresponding button-press code value, determines a button control mode indicated by the button-press operation command, and enables the button control mode as a current control mode of the remote controller.

Figure 7:
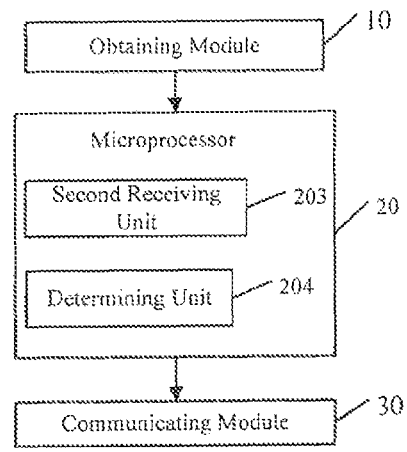
FIG. 7 is a third structure diagram of a multi-mode remote controller according to the present invention.

Referring to FIG. 7, it is a third structure diagram of a multi-mode remote controller according to the present invention. The multi-mode remote controller comprises the obtaining module 10, and the communicating module 30 described in FIG. 5. In one embodiment, the microprocessor 20 comprises:

a second receiving unit 203 which is used for receiving mode indication information generated and sent by a user terminal;

specifically, in one embodiment of the present invention, the user terminal generating the mode indication information comprises: according to a control mode selected by the user on a human-computer interaction interface provided by the user terminal, generating mode indication information; and/ or according to a control mode requested by a currently running application program, generating mode indication information; the second receiving unit 203 is used to receive the mode indication information generated and sent by the user terminal.

a determining unit 204 which is used for determining, according to the mode indication information received by the second receiving unit, a control mode indicated by the mode indication information to have the control mode to serve as a current control mode of the remote controller.

Figure 8:
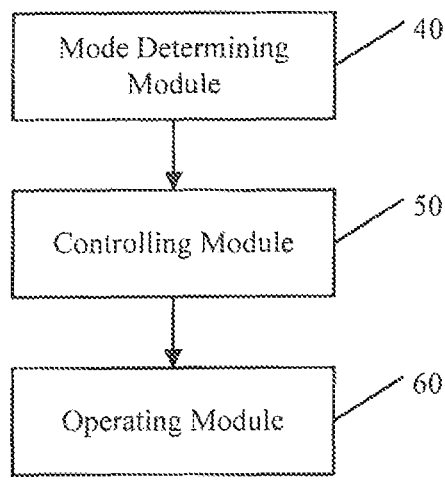
FIG. 8 is a structure diagram of a user terminal according to the present invention.

Referring to FIG. 8, it is a structure diagram of a user terminal according to the present invention. As shown in FIG. 8, the user terminal comprises:

a mode determining module 40 which is used for determining a current control mode of a user terminal, the control mode including various control modes;

specifically, the current control mode of the user terminal includes any one or more of a button control mode, a mouse control mode, a touchscreen control mode, a trackball control mode;

the specific method for determining the current control mode of the user terminal is:

collecting a remote control signal including a touchscreen absolute coordinate sent by a remote controller;

judging whether it is a click operation or a continuous operation according to the remote control signal;

if it is a click operation, determining that the current control mode is a button control mode, and the click operation can be interpreted as a button press operation; and if it is a continuous operation, according to a current application scenario of the user terminal, determining that the current control mode is a mouse control mode, a touchscreen control mode, or a trackball control mode, and the continuous operation can be correspondingly interpreted as a mouse operation, a touch control operation, or a trackball operation; the corresponding user terminal interface displays respective cursor statuses to show respective control modes; the user terminal interface displays a mouse cursor in the mouse control mode, displays a trackball cursor in the trackball control mode, and conceals the cursor in the touchscreen control mode;

a controlling module 50 which is used for determining an operation manner for a currently displayed content according to the current control mode of the user terminal determined by the mode determining module 40 and a received touch control signal collected by a remote controller;

specifically, in the mode determining module 40, it is assumed that the current control mode of the user terminal is determined as a button control mode; when the user terminal herein receives a touch control signal on a touchscreen from a user collected by the remote controller, such as a button click operation, based on the touch control signal, the user terminal converts the touch control signal into a corresponding button-press code value according to a click position of the touchscreen, generates a remote control instruction corresponding to the touch control signal under the button control mode according to the button-press code value, and determines an operation manner for a currently displayed content, such as inputting a character on the currently displayed content, or other button press operations;

an operating module 60 which is used for operating the currently displayed content according to the operation manner for the currently displayed content which is determined by the controlling module 50;

specifically, the operating module 60 operates the currently displayed content, such as inputting a character and so on, according to the operation manner for the currently displayed content determined by the controlling module 50, such as inputting a character on the currently displayed content, and so on.

Figure 9:
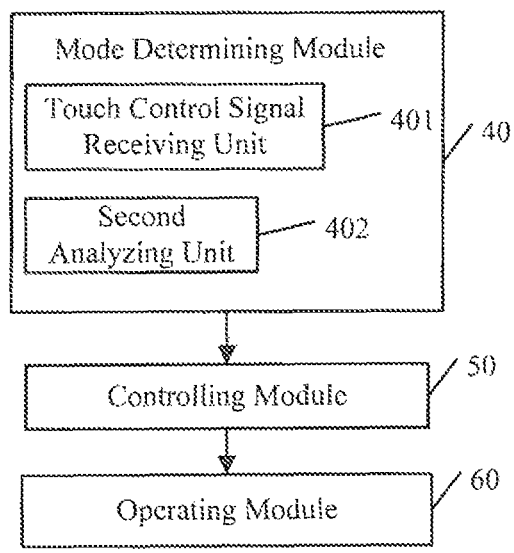
FIG. 9 is a second structure diagram of a user terminal according to the present invention.

Referring to FIG. 9, it is a second structure diagram of a user terminal according to the present invention. The user terminal comprises the controlling module 50, and the operating module 60 described in FIG. 8. In one embodiment, the mode determining module 40 comprises:

a touch control signal receiving unit 401 which is used for collecting a remote control signal including a touchscreen absolute coordinate sent by the remote controller;

specifically, the remote control signal including a touchscreen absolute coordinate sent by the remote controller comprises: vertical/horizontal-coordinate values for a click on the touchscreen, a certain point for a continuous press on the touchscreen, vertical/horizontal-coordinate values for a continuous swipe action on multiple points, vertical/horizontal-coordinate values for a continuous swipe action on a single point, a button-press operation code, a button-press operation code with vertical/horizontal-coordinates for a click on a touchscreen, or a button-press operation code with vertical/horizontal-coordinates for a continuous swipe action on the touchscreen;

a second analyzing unit 402 which is used for judging whether it is a click operation or a continuous operation according to the remote control signal received by the touch control signal receiving unit 401; if it is the click operation, determining the current control mode as a key control mode; if it is the continuous operation, determining, according to a current application scenario of the user terminal, the current control mode as a mouse control mode, a touchscreen control mode, or a trackball control mode; the corresponding user terminal interface displays respective cursor statuses to show respective control modes; the user terminal interface displays a mouse cursor in the mouse control mode, displays a trackball cursor in the trackball control mode, and conceals the cursor in the touchscreen control mode;

specifically, according to the remote control signal including a touchscreen absolute coordinate sent by the remote controller and collected by the touch control signal receiving unit 401, for example, if the remote control signal collected by the touch control signal receiving unit 401 is a remote control signal including vertical/horizontal-coordinates for a click on the touchscreen or the one including a certain point for a continuous press on the touchscreen, it can be judged as a click operation; for another example, if the remote control signal collected by the remote control signal receiving unit 401 is a remote control signal including vertical/horizontal-coordinates for a continuous swipe action on the touchscreen, it can be judged as a continuous operation; according to whether the operation judged by the second analyzing unit 402 is a click operation or a continuous operation, if the operation judged by the second analyzing unit 402 is the click operation, the current control mode can be determined as a button control mode, the click operation can be interpreted as a button press operation, and the continuous press can be interpreted as a continuous button press operation; if the operation judged by the second analyzing unit 402 is the continuous operation, according to a current application scenario of the user terminal, the current control mode can determined as a mouse control mode, a touchscreen control mode, or a trackball control mode, and the continuous operation correspondingly can be interpreted as a mouse operation, a touch control operation, or a trackball operation.

Figure 10:
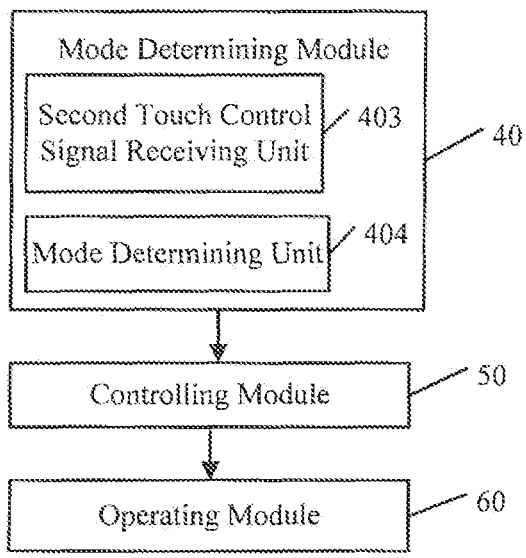
FIG. 10 is a third structure diagram of a user terminal according to the present invention.

Referring to FIG. 10, it is a third structure diagram of a user terminal according to the present invention. The user terminal comprises the controlling module 50, and the operating module 60 described in FIG. 8. In one embodiment, the mode determining module 40 comprises:

a second touch control signal receiving unit 403 which is used for receiving a touch control signal of a user clicking a mode button on the remote controller;

specifically, in one embodiment of the present invention, the mode button includes a mechanical button or a touch button on the touchscreen, and the mechanical button includes a button, a mouse, a trackball, a touchscreen, etc.;

a mode determining unit 404 which is used for analyzing the touch control signal received by the second touch control signal receiving unit, determining a control mode indicated by the touch control signal to have the control mode to serve as a current control mode;

specifically, according to the touch control signal of the user clicking on the mode button on the touchscreen received by the touch control signal receiving unit 403, the user terminal analyzes the touch control signal, and determines a control mode indicated by the touch control signal to have the control mode to serve as a current control mode; for example, the touch control signal receiving unit 403 receives a button touch control signal of the user clicking button action on the touchscreen, the button touch control signal of the button clicking operation can be analyzed; the touch control signal can be converted into a corresponding button-press code value; and a button control mode indicated by the touch control signal can be determined and to be served as a current control mode of the remote controller.

Figure 11:
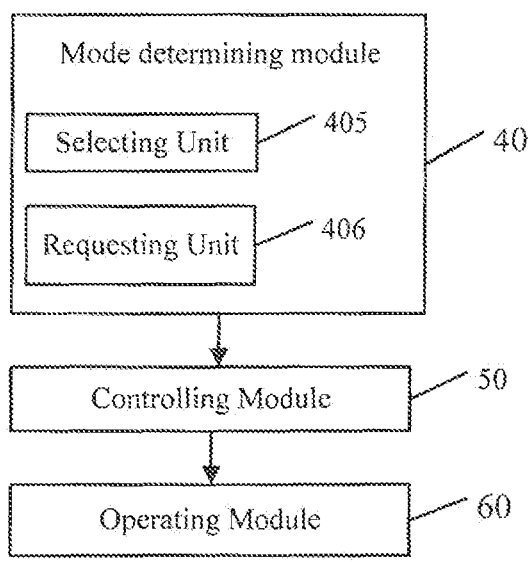
FIG. 11 is a fourth structure diagram of a user terminal according to the present invention.

Referring to FIG. 11, it is a fourth structure diagram of a user terminal according to the present invention. The user terminal comprises the controlling module 50, and the operating module 60 described in FIG. 8. In one embodiment, the mode determining module 40 comprises:

a selecting module 405 which is used for denoting a current control mode of the remote controller according to a control mode currently selected by a user on a provided human-computer interactive interface;

a requesting module 406 which is used for denoting a control module requested by a currently running application program as a current control module of the remote controller.

In one embodiment of the present invention, the user terminal can select or request a current control mode according to a human-computer interaction interface provided by the user terminal or a currently running application program of the user terminal, and can generate mode indication information. The remote controller can receive the mode indication information generated and sent by the user terminal, and can indicate with an indicator light.

In one embodiment of the present invention, it is also provided a remote control system for a multi-mode remote controller, the remote control system for the multi-mode remote controller comprises:

a remote controller which is used for performing various on a user terminal and from a user;

specifically, the remote controller may include a touchscreen, a microprocessor, and a communicating module; based on the touchscreen, the remote controller can obtain the touch control signal on the touchscreen from the user; the microprocessor can analyze the touch control signal obtained by the touchscreen, and generate a remote control instruction corresponding to the touch control signal; the communicating module can send the remote control instruction generated by the microprocessor to the user terminal; the microprocessor can also receive mode indication information generated and sent by the user terminal through the communication module, and indicate with an indicator light;

a user terminal including a television set-top box or a television;

specifically, the user terminal is used to receive different kinds of remote control instructions on the remote controller from the user; according to the received remote control instruction and the current application scenario, it can determine the current control mode of the user terminal, interpret the remote control instruction as respective operation instruction for the user terminal in respective mode, and perform the respective operation on the currently displayed content; and/or it can select or request the current control mode according to a human-computer interaction interface provide by the user terminal or a currently running application program of the user terminal, and generate mode indication information which is to be sent to the remote controller.

What are described above are relatively preferred embodiments of the present invention, not intended to limit the present invention. Any modification, equivalent replacement, improvement, etc. that not departs from the spirit and principle of the present invention should be included in the protection scope of the present invention.

What is claimed is:

1. A remote control method for a multi-mode remote controller, comprising the steps of:
receiving mode indication information generated and sent by a user terminal;
determining a control mode indicated by the mode indication information, and enabling the control mode as a current control mode of the remote controller;
analyzing a touch control signal, and generating a remote control instruction to be sent to the user terminal so that the user terminal operates a currently displayed content, wherein the remote control instruction corresponds to the touch control signal under the current control mode.

2. The remote control method of claim 1, wherein
the mode indication information is generated according to a user selecting a control mode on a human-computer interaction interface provided by the user terminal.

3. The remote control method of claim 2, wherein:
the control mode includes a button control mode, a mouse control mode, a touchscreen control mode, and a trackball control mode;
the step of analyzing the touch control signal, generating the remote control instruction corresponding to the touch control signal under the current control mode comprises:
when the current control mode is the button control mode, converting the touch control signal into a corresponding button-press code value according to a click position of the touchscreen, and according to the button-press code value, generating the remote control instruction corresponding to the touch control signal under the button control mode;
when the current control mode is the mouse control mode, converting the touch control signal into a relative coordinate value of a corresponding position, and according to the relative coordinate value, generating the remote control instruction corresponding to the touch control signal under the mouse control mode;
when the current control mode is the touchscreen control mode, converting the touch control signal into a touchscreen operation code, and according to the touchscreen operation code, generating the remote control signal corresponding to the touch control signal under the touchscreen control mode; and
when the current control mode is the trackball control mode, converting the touch control signal into a relative offset of a coordinate of a corresponding position, and according to the relative offset of the coordinate of the corresponding position, generating the remote control instruction corresponding to the touch control signal under the trackball control mode.

4. The remote control method of claim 1, wherein the mode indication information is generated according to the control mode requested by a currently running application program.

5. The remote control method of claim 4, wherein:
the control mode includes a button control mode, a mouse control mode, a touchscreen control mode, and a trackball control mode;
the step of analyzing the touch control signal, generating the remote control instruction corresponding to the touch control signal under the current control mode comprises:
when the current control mode is the button control mode, converting the touch control signal into a corresponding button-press code value according to a click position of the touchscreen, and according to the button-press code value, generating the remote control instruction corresponding to the touch control signal under the button control mode;
when the current control mode is the mouse control mode, converting the touch control signal into a relative coordinate value of a corresponding position, and according to the relative coordinate value, generating the remote control instruction corresponding to the touch control signal under the mouse control mode;
when the current control mode is the touchscreen control mode, converting the touch control signal into a touchscreen operation code, and according to the touchscreen operation code, generating the remote control signal corresponding to the touch control signal under the touchscreen control mode; and
when the current control mode is the trackball control mode, converting the touch control signal into a relative offset of a coordinate of a corresponding position, and according to the relative offset of the coordinate of the corresponding position, generating the remote control instruction corresponding to the touch control signal under the trackball control mode.

6. The remote control method of claim 1, wherein:
the control mode includes a button control mode, a mouse control mode, a touchscreen control mode, and a trackball control mode;
the step of analyzing the touch control signal and generating the remote control instruction corresponding to the touch control signal under the current control mode comprises:
when the current control mode is the button control mode, converting the touch control signal into a corresponding button-press code value according to a click position of the touchscreen, and according to the button-press code value, generating the remote control instruction corresponding to the touch control signal under the button control mode;
when the current control mode is the mouse control mode, converting the touch control signal into a relative coordinate value of a corresponding position, and according to the relative coordinate value, generating the remote control instruction corresponding to the touch control signal under the mouse control mode;
when the current control mode is the touchscreen control mode, converting the touch control signal into a touchscreen operation code, and according to the touchscreen operation code, generating the remote control signal corresponding to the touch control signal under the touchscreen control mode; and
when the current control mode is the trackball control mode, converting the touch control signal into a relative offset of a coordinate of a corresponding position, and according to the relative offset of the coordinate of the corresponding position, generating the remote control instruction corresponding to the touch control signal under the trackball control mode.

7. A multi-mode remote controller, comprising various control modes and specifically comprising:
a receiving unit for receiving mode indication information generated and sent by a user terminal;
a determining unit for determining, according to the mode indication information received by the receiving unit, a control mode indicated by the mode indication information to have the control mode serve as a current control mode of the remote controller;
an obtaining module for obtaining a touch control signal on a touchscreen from a user;
a microprocessor for analyzing the touch control signal obtained on the touchscreen and generating a remote control instruction corresponding to the touch control signal under the current control mode; and
a communicating module for sending the remote control instruction generated by the microprocessor to the user terminal.

8. The multi-mode remote controller of claim 7, wherein the remote controller further comprises:
an indicator light for indicating a current control mode of the remote controller.

9. A user terminal, comprising:
a mode determining module for determining a current control mode of a user terminal and generating mode indication information to be sent to a remote controller to enable a control mode indicated by the mode indication information to serve as a current control mode of the remote controller;
a controlling module for determining an operation manner for a currently displayed content according to the current control mode of the user terminal determined by the mode determining module and a received touch control signal collected by the remote controller; and
an operating module for operating the currently displayed content according to the operation manner for the currently displayed content which is determined by the controlling module.

10. The user terminal of claim 9, wherein the mode determining module comprises:
a touch control signal receiving unit for collecting a remote control signal including a touchscreen absolute coordinate sent by the remote controller;
an analyzing unit for judging whether the operation manner is a click operation or a continuous operation according to the remote control signal, wherein if the operation manner is the click operation, determining the current control mode of the user terminal as a key control mode, and if the operation manner is the continuous operation, determining, according to a current application scenario of the user terminal, the current control mode of the user terminal as a mouse control mode, a touchscreen control mode, or a trackball control mode.

11. The user terminal of claim 9, wherein the mode determining module comprises:

a touch control signal receiving unit for receiving a touch control signal of a user clicking a mode button on the remote controller;

a mode determining unit for analyzing the touch control signal received by the touch control signal receiving unit, determining a control mode indicated by the touch control signal to have the control mode to serve as a current control mode of the user terminal.

12. The user terminal of claim 9, wherein the mode determining module is operable to generate the mode indication information
according to a control mode currently selected by a user on a provided human-computer interactive interface.

13. The user terminal of claim 9, wherein the mode determining module is operable to generate the mode indication information
according to a control mode requested by a currently running application program.

14. The user terminal of claim 9, wherein the user terminal comprises a television set-top box or a television.

* * * * *

UNITED STATES PATENT AND TRADEMARK OFFICE
CERTIFICATE OF CORRECTION

PATENT NO. : 9,268,426 B2  
APPLICATION NO. : 14/238713  
DATED : February 23, 2016  
INVENTOR(S) : Xiaohui Wang et al.

Page 1 of 1

It is certified that error appears in the above-identified patent and that said Letters Patent is hereby corrected as shown below:

Title Page

Item (73) Assignees, on line 5, please change "Gaungdong" to --Guangdong--;

Item (30) Foreign Application Priority Data, please change "2012 1 0043653"

to --2012 1 0043653.9--.

Signed and Sealed this  
Third Day of May, 2016

Michelle K. Lee  
*Director of the United States Patent and Trademark Office*